(12) United States Patent
Diamant et al.

(10) Patent No.: US 10,592,250 B1
(45) Date of Patent: Mar. 17, 2020

(54) SELF-REFILL FOR INSTRUCTION BUFFER

(71) Applicant: Amazon Technologies, Inc., Seattle, WA (US)

(72) Inventors: Ron Diamant, Albany, CA (US); Ilya Minkin, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 16/014,646

(22) Filed: Jun. 21, 2018

(51) Int. Cl.
| | |
|---|---|
| *G06F 9/38* | (2018.01) |
| *G06F 12/1081* | (2016.01) |
| *G06N 5/04* | (2006.01) |
| *G06F 5/06* | (2006.01) |
| *G06N 3/04* | (2006.01) |
| *G06F 13/28* | (2006.01) |

(52) U.S. Cl.
CPC .............. *G06F 9/3814* (2013.01); *G06F 5/06* (2013.01); *G06F 12/1081* (2013.01); *G06F 13/28* (2013.01); *G06N 3/0472* (2013.01); *G06N 5/046* (2013.01)

(58) Field of Classification Search
None
See application file for complete search history.

(56) References Cited

U.S. PATENT DOCUMENTS

| | | | | |
|---|---|---|---|---|
| 10,120,580 | B2* | 11/2018 | Olcay | ..................... G06F 3/061 |
| 2004/0230784 | A1* | 11/2004 | Cohen | ................. G06F 9/44521 |
| | | | | 713/1 |
| 2007/0073922 | A1* | 3/2007 | Go | .......................... G06F 13/28 |
| | | | | 710/22 |
| 2007/0240142 | A1* | 10/2007 | Brokenshire | ......... G06F 8/4441 |
| | | | | 717/159 |
| 2009/0119460 | A1* | 5/2009 | Lin | ..................... G06F 12/0888 |
| | | | | 711/138 |
| 2009/0293048 | A1* | 11/2009 | Chen | ....................... G06F 8/433 |
| | | | | 717/151 |
| 2013/0258376 | A1* | 10/2013 | Tsuchiya | ............ G03G 15/5025 |
| | | | | 358/1.13 |
| 2014/0317333 | A1* | 10/2014 | Dorst | ...................... G06F 13/28 |
| | | | | 710/308 |
| 2015/0277924 | A1* | 10/2015 | Zappulla | ............... G06F 9/3851 |
| | | | | 712/215 |

* cited by examiner

*Primary Examiner* — Eric Coleman
(74) *Attorney, Agent, or Firm* — Kilpatrick Townsend & Stockton LLP

(57) ABSTRACT

Disclosed herein are techniques for self-refilling an instruction buffer by an execution engine while the execution engine executes instructions in the instruction buffer. An instruction loader splits instruction code into sections of code and creates a data store (e.g., a DMA ring) for loading the sections of code into the instruction buffer. In some embodiments, an instruction is added to some sections of code. The instruction, when executed by the execution engine, triggers the loading of one or more sections of code into the instruction buffer based on one or more entries in the data store. In some embodiments, a hardware logic in the execution engine is configured to trigger the loading of the sections of code into the instruction buffer. In some embodiments, the one or more sections of code are loaded into the instruction buffer through a refill page that is different from the instruction buffer.

20 Claims, 7 Drawing Sheets

SELF-REFILL FOR INSTRUCTION BUFFER

BACKGROUND

In a computing system, an instruction buffer is generally used to store instructions that may be decoded and executed by an execution engine, such as a processing unit. For example, an artificial neural network, such as a deep neural network, may include multiple layers of processing nodes. Each processing node on a layer can perform computations on input data generated by processing nodes on the preceding layer to generate output data. For example, a convolutional neural network may include multiple convolution layers, activation layers, and pooling layers, where each of the layers may be implemented using an execution engine, such as a convolution engine, an activation engine, a pooling engine, or a stream processor. Each of these execution engines may use an instruction buffer to temporally store instructions to be decoded by an instruction decoder and executed by an execution unit of the execution engine to perform various functions. In general, a neural network may be developed, trained, and made available to many end users. The end users can then use the trained neural network to continuously perform various tasks (which may be referred to as the inference process) on input data.

In many cases, due to the hardware limitation, the size of the instruction buffer may be smaller than the size of the instruction code used to perform a user function, such as an inference. Therefore, the instruction buffer may need to be refilled during each inference. In addition, because the user function (e.g., the inference process) may be performed continuously for different sets of input data, the instruction code for the user function may need to be reloaded into the instruction buffer for each inference. In general, it is desirable that the instruction buffer can be refilled while the execution engine is executing some other instructions stored in the instruction buffer, such that the user function can be performed more quickly and more efficiently using the available resources of the computing system.

BRIEF DESCRIPTION OF THE DRAWINGS

Various embodiments in accordance with the present disclosure will be described with reference to the drawings, in which.

DETAILED DESCRIPTION

Figure 1:
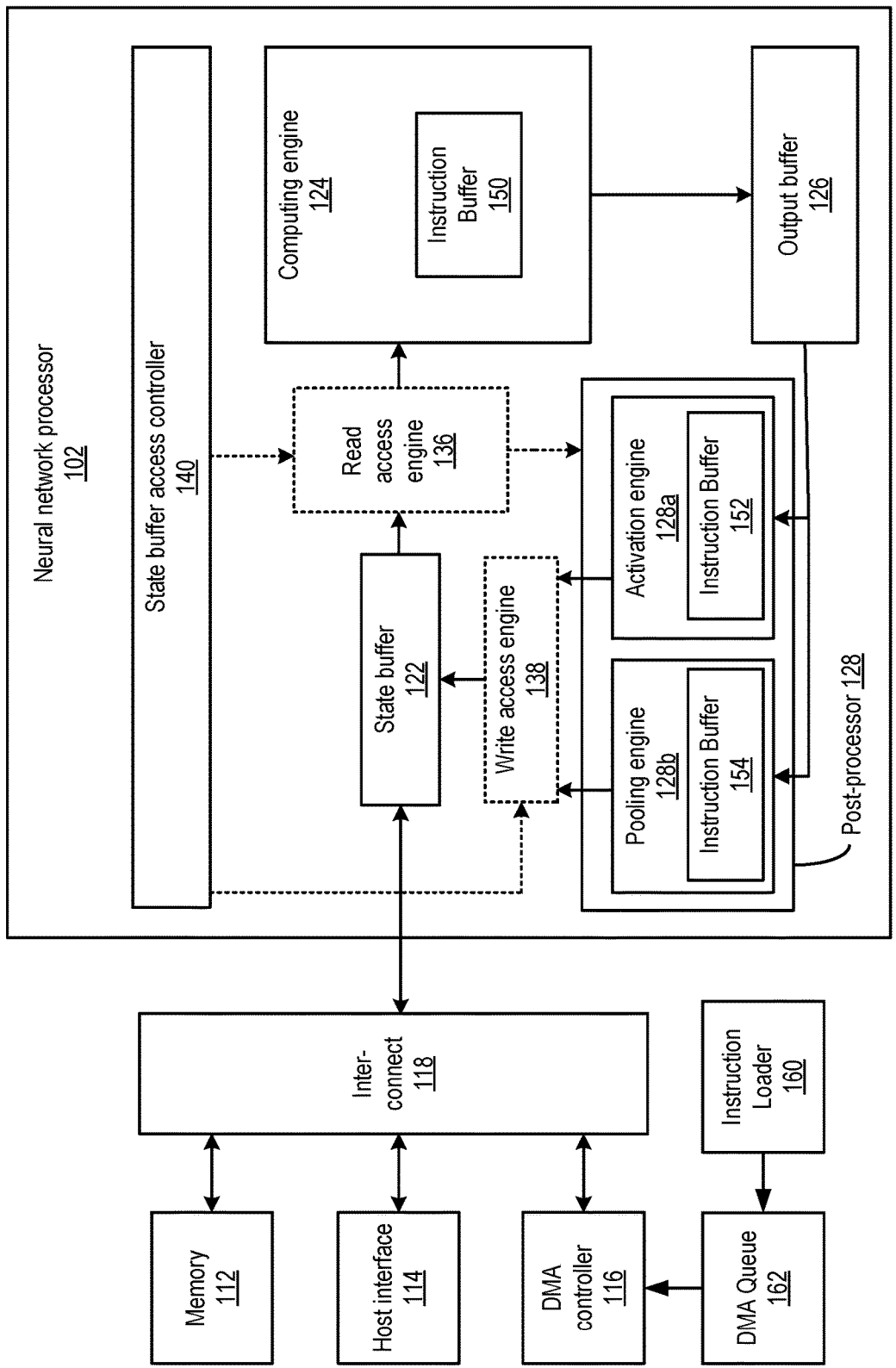
FIG. 1 illustrates an example of an apparatus for an artificial neural network according to certain embodiments.
Figure 2:
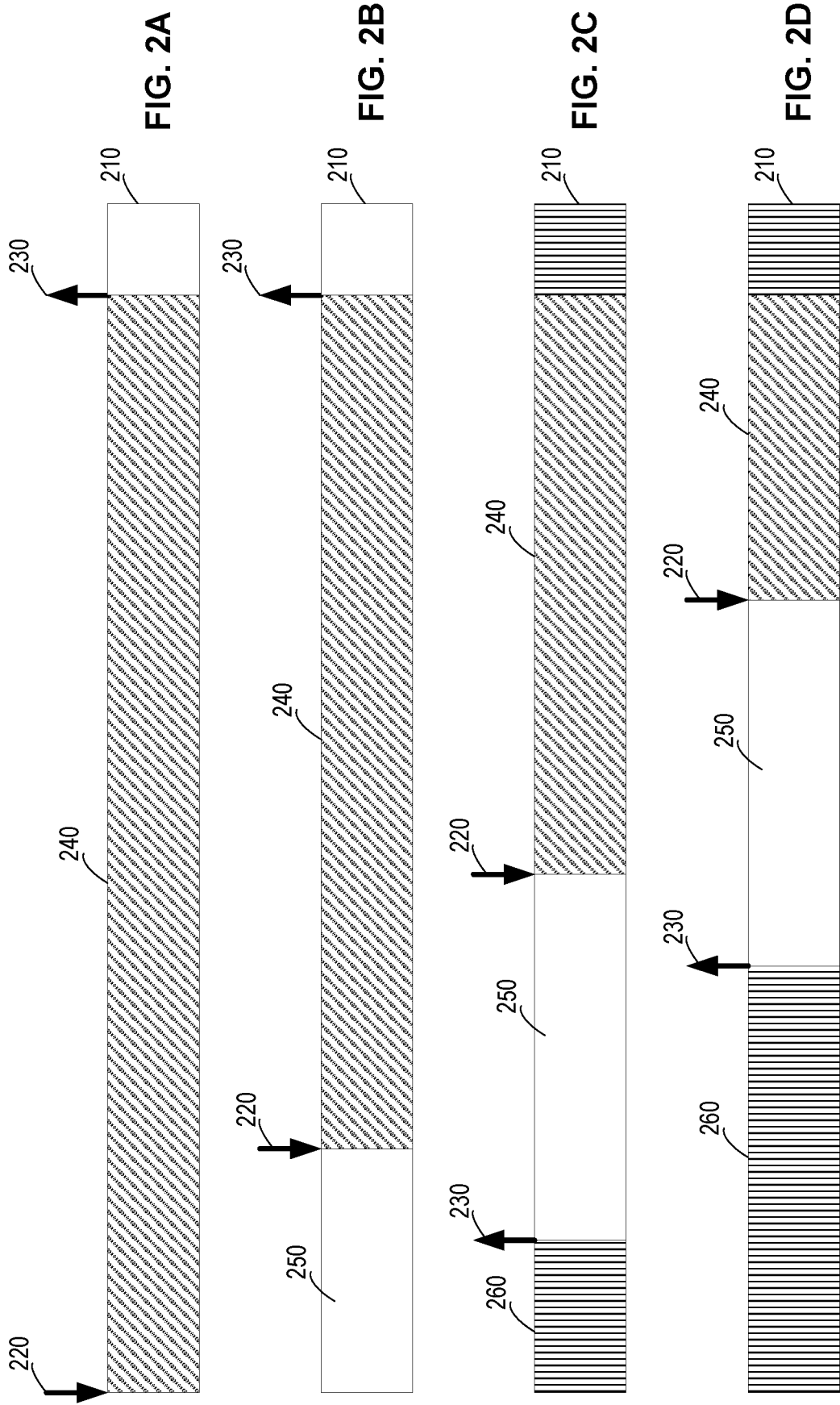
FIGS. 2A-2D illustrate an example of refiling an instruction buffer using an external entity.

Techniques disclosed herein relate generally to loading instructions into instruction buffers of execution engines of a computing system, and more specifically, to self-refilling the instruction buffers during execution of instructions by the execution engines.

An execution engine, such as a processing unit, may include a pipeline that includes instruction fetch, decode, and execution stages. In some execution cycles, the execution stage may perform, for example, arithmetic instructions (add, subtract, shift, etc.) without accessing a memory, and thus the instruction fetch from a storage device may be performed simultaneously with the execution of the arithmetic instructions. In some execution cycles, the instructions may include a memory operation, and thus a new instruction may not be fetched from the storage device when the execution stage is performing the memory operation. To improve the Cycles Per Instruction (CPI), more than one instruction (e.g., a block of instructions) may be fetched per cycle (with a fetch rate greater than the execution rate) and stored in an instruction buffer. In many cases, the instruction buffer may be much smaller than the size of the instruction code (e.g., a software program) for performing a certain function. Thus, a mechanism may be needed to determine whether the instruction buffer has space available and load new instructions into the instruction buffer when the instruction buffer has space available for storing new instructions and before the instruction buffer becomes empty, such that the execution stage may continuously execute instructions stored in the instruction buffer. This mechanism may generally be achieved by using an entity external to the execution engine, where the external entity may monitor the execution of the instructions stored in the instruction buffer, for example, by periodically reading a pointer for the instruction buffer to determine if new instructions should be loaded into the instruction buffer. Using the external entity to periodically read and compare the pointer may use a lot of processing time (e.g., CPU time) and/or hardware resources.

In one example of a computing system that includes a convolutional neural network, multiple processing blocks, such as tensor processing blocks (TPBs) of a tensor processing unit (TPU) for the TensorFlow® framework or processing blocks in a GPU, may be used. Each processing block may include a convolution layer, an activation layer, a pooling layer, and a stream processor. Each of the convolution layer, activation layer, pooling layer, and stream processor may be implemented using an execution engine that includes its own instruction buffer. Due to the hardware limitation, the size of the instruction buffer may be much smaller than the size of the instruction code used to perform an inference. Therefore, the instruction buffer may need to be refilled during each inference. In addition, because the inference process may be performed continuously and repeatedly for different sets of input data, the instruction code for the inference process may need to be reloaded into the instruction buffer for each inference.

Disclosed herein are techniques for automatically refilling the instruction buffer after a number of instructions in the instruction buffer have been executed, without the involvement of external monitoring and/or triggering entities to control the refilling. The execution engine may trigger the refilling (e.g., by executing an instruction or via an internal hardware logic) using a direct memory access (DMA) controller (or other refill controller). The DMA controller may load new instructions into available space in the instruction buffer while the execution engine executes existing instructions in the instruction buffer. In this way, the execution engine may continue to execute instructions without having to wait for new instructions to be loaded into the instruction buffer. In addition, no external entity is needed to monitor the execution of the instructions and initiate the refilling of the instruction buffer. Thus, the processing time of the execution engine and/or external processors (e.g., a CPU) can be used more efficiently to perform user functions.

According to certain embodiments, an instruction loader (e.g., a compiler or a runtime application) may split the instruction code used by an execution engine to perform a user function (e.g., an inference) into multiple sections (which may also be referred to as chunks or blocks), where the size of each section is less than the size of the instruction buffer, such as less than or equal to a half of the size of the instruction buffer. A refill DMA ring may also be created by the instruction loader based on the sections of the instruction code, where each entry (also referred to as a descriptor) in the refill DMA ring may correspond to one section of the instruction code and may be used to load the section of the instruction code into the instruction buffer using a DMA controller. Software or hardware based methods may use the refill DMA ring to automatically refill the instruction buffer.

In some embodiments, an instruction may be added to some sections of the instruction code. The instruction, when executed by the execution engine, may trigger the DMA controller to copy a section of the instruction code into the instruction buffer based on an entry in the refill DMA ring. In some embodiments, a hardware logic of the execution engine may cause the DMA controller to copy a section of the instruction code into the instruction buffer based on an entry in the refill DMA ring, when the hardware logic determines that the free space in the instruction buffer is greater than a threshold value. In some embodiments, the DMA process may be restarted to load the same instruction code into the instruction buffer in order to repeatedly execute the instruction code for different input data (e.g., for inferences based on different input data).

According to some embodiments, a refill page (e.g., a buffer of 4-8 KB) may be used by the DMA controller to load instructions into the instruction buffer. The instructions may first be written into the refill page. The hardware may copy the instructions from the refill page to the instruction buffer, and increase the value of the tail pointer of the instruction buffer when new instructions are written into the instruction buffer. The hardware can also handle the wraparound of the instruction buffer. Thus, the DMA controller may copy sections of the instruction code into the same refill page without having to track the exact address to write to.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described. The figures and description are not intended to be restrictive. The word "example" is used herein to mean "serving as an example, instance, or illustration." Any embodiment or design described herein as "example" is not necessarily to be construed as preferred or advantageous over other embodiments or designs.

Techniques disclosed herein may be used to refill the instruction buffer for any processing unit. For example, techniques disclosed herein can be used to refill various instruction buffers in a convolutional neural network. Convolutional neural networks (also referred to as ConvNets or CNNs) are a type of neural networks that are very effective for applications such as image recognition and classification.

For example, CNNs may be used to identify faces, objects, and traffic signs for use in robots and self-driving cars. CNNs may be used in natural language processing tasks (such as sentence classification) as well. A CNN may perform operations including, for example, (1) convolution; (2) non-linearity function (e.g., ReLU); (3) pooling or sub-sampling; and (4) classification. These operations may be the basic building blocks of every convolutional neural network. Different CNNs may have different combinations of these four main operations.

The training process and inference process for a neural network (e.g., a CNN) may be performed on hardware, software, or a combination of hardware and software. Training an artificial neural network or using the trained artificial neural network for inference generally requires significant amount of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for training and/or inference. Training and inference may be performed on a cloud, on a data center, or on a device.

FIG. 1 illustrates an example of an apparatus 100 for an example of an artificial neural network. Apparatus 100 may be part of a computer system, such as a data center server. In some embodiments, apparatus 100 may be part of a multi-tenant compute service system (e.g., a cloud) and may communicate with a host device (not shown in FIG. 1) to provide computing and memory resources for a computing service. Apparatus 100 may include a neural network processor 102 coupled to memory 112, a direct memory access (DMA) controller 116, and a host interface 114 via an interconnect 118. Neural network processor 102 may provide computing resources to support inference using a trained neural network. More detail of the operation of neural network processor 102 is described below.

Memory 112 may be configured to store the instructions, input data (e.g., pixel data of images), and the weights (e.g., the filter data) or other parameters of the trained neural network received from, for example, the host device. Memory 112 may also be used to store the output of neural network processor 102 (e.g., one or more image recognition decisions on the input images) or some intermediary data. Memory 112 may include any suitable memory, such as dynamic random access memory (DRAM), synchronous DRAM (SDRAM), double data rate DRAM (DDR DRAM), storage class memory (SCM), flash memory devices, etc.

DMA controller 116 may be configured to perform DMA operations to transfer data between neural network processor 102 and the host device or memory 112. For example, the host device may store the instructions, input data, the weights, and other parameters of the neural network at memory 112. The host device may provide the memory addresses for the stored instructions, data, weights, and other parameters of the neural network to neural network processor 102 (e.g., in the form of memory descriptors). Neural network processor 102 may then obtain the stored instructions, data, weights, or other parameters of the neural network using DMA controller 116 based on the memory addresses provided by the host device. Neural network processor 102 may also store the results of computations (e.g., one or more image recognition decisions or intermediary data) at memory 112, and provide the memory addresses for the stored results to the host device.

Host interface 114 may enable communications between the host device and neural network processor 102. For example, host interface 114 may be configured to transmit the memory descriptors including the memory addresses of the stored data (e.g., input data, weights, results of computations, etc.) between the host device and neural network processor 102. Host interface 114 may include, for example, a peripheral component interconnect express (PCIe) interface or any suitable interface for communicating with the host device.

Neural network processor 102 may provide the computing resources to support the neural network computations for inference, such as image classification. In the example shown in FIG. 1, neural network processor 102 may include an integrated circuit, such as a system-on-chip (SoC), FPGA, or ASIC. Neural network processor 102 may include a number of circuit components, such as a state buffer 122, a computing engine 124, an output buffer 126, and a post-processor 128. In some implementations, neural network processor 102 may also include a read access engine 136 and a write access engine 138 to provide computing engine 142 and post-processor 128 with read and write access to state buffer 122 as discussed in detail below.

State buffer 122 may be configured to provide caching of data used for computations at computing engine 124. The data cached at state buffer 122 may include, for example, the input data and weights obtained from memory 112, output data from computing engine 124, and/or output data from post-processor 128. The caching may reduce the effect of memory access bottleneck (e.g., caused by the latencies at memory 112, DMA controller 116, interconnect 118, etc.) on the performance of computing engine 124. State buffer 122 may be an on-chip memory device and may include, for example, static random access memory (SRAM). In some embodiments, state buffer 122 may be partitioned based on the organization of computing engine 124. For example, state buffer 122 may include multiple SRAM banks, where each bank may be configured to store input data and weights for a row of computing engine 124.

Computing engine 124 may include an array of processing elements (PEs) configured to perform one or more arithmetic operations (e.g., vector multiplication) for neural network computations. In some implementations, computing engine 124 may be a matrix multiplication unit that may be used for matrix convolution and/or matrix multiplication, and thus may be used to implement a convolution layer or a fully-connected layer. For example, in some implementations, computing engine 124 may include a systolic array that includes a two-dimensional array of processing elements arranged in rows and columns.

Post-processor 128 may be configured to perform post-processing on the outputs of computing engine 124 (which may act as a neural network layer, such as a convolution layer or fully-connected layer) that may be stored in output buffer 126 to generate final outputs for the neural network layer. In the example shown in FIG. 1, post-processor 128 may include an activation engine 128a and a pooling engine 128b. Activation engine 128a may perform one or more activation (non-linear) functions, such as tan h, sigmoid, ReLU, etc., on the outputs of a convolution layer to generate the output data, and store the output data at state buffer 122. In some implementations, activation engine 128a may include one or more multiplier circuits. Pooling engine 128b may perform, for example, maximum pooling, average pooling, etc., on the outputs of a convolution layer or activation engine 128a to generate subsamples, and store the subsamples at state buffer 122. In some implementations, pooling engine 128b may also include one or more multiplier circuits. Pooling engine 128b and/or activation engine 128a may also be controlled to be skipped for certain convolution layers. For example, as discussed above, a CNN may perform multiple convolution and ReLU operations before performing a pooling operation.

In some implementations, post-processor 128 may also include a Softmax engine (not shown in FIG. 1) that can perform a Softmax function on the output of the fully-connected layer. As described above, the Softmax engine may take a vector of real-valued scores from a fully-connected layer and map the vector of real-valued scores to a vector of probability values between zero and one that sum to one.

Read access engine 136 may provide read access to state buffer 122 for a read access requesting device including, for example, computing engine 124 and post-processor 128. Write access engine 138 may provide write access to state buffer 122 for a write access requesting device including, for example, post-processor 128. Each of read access engine 136 and write access engine 138 may convert a sequential series of access operations (e.g., multiple read or write operations across multiple clock cycles) to a single access operation to reduce power and reduce wait latency. Each of read access engine 136 and write access engine 138 may be organized based on state buffer 122. For example, each of read access engine 136 and write access engine 138 may include multiple sub-engines corresponding to multiple SRAM banks of state buffer 122, with each sub-engine providing access to a corresponding SRAM bank. A sub-engine of read access engine 136 may convert a sequential series of read access operations to a corresponding SRAM bank for multiple data elements (e.g., by a row of computing engine 124 or by post-processor 128) to a single read access for the multiple data elements. A sub-engine of write access engine 138 may also convert a sequential series of write accesses for storing multiple data elements at the corresponding SRAM bank (e.g., by post-processor 128) to a single write access for the multiple data elements.

In some embodiments, neural network processor 102 may also include a stream processor (not shown in FIG. 1) that handles the parallel processing and coordinates the operations of the different execution engines in neural network processor 102. Each of computing engine 124, activation engine 128a, pooling engine 128b, and the stream engine may include an instruction buffer that temporally stores the instruction code to be executed by the respective execution engine. For example, computing engine 124 may include an instruction buffer 150, activation engine 128a may include an instruction buffer 152, and pooling engine 128b may include an instruction buffer 154. Each instruction buffer may be connected to interconnect 118 that is connected to a storage device (e.g., memory 112) and a DMA controller (e.g., DMA controller 116) as described above. Each of computing engine 124, activation engine 128a, pooling engine 128b, and the stream engine may also include an instruction decoder (not shown in FIG. 1) for decoding each instruction into opcodes or a set of signals that drive other components in the respective execution engine.

As discussed above, the instruction buffer of an execution engine, such as instruction buffer 150 of computing engine 124, may have a limited size that is much smaller than the size of the instructions used by the execution engine to perform a user function (e.g., an inference). Thus, the instruction buffer may need to be refilled during each inference. In addition, because the inference process may be performed continuously for different sets of input data, the instruction code for the inference process may need to be reloaded into the instruction buffer for each inference. To refill the instruction buffer while instructions in the instruction buffer are being executed by the execution engine, an entity may be used to determine whether the instruction buffer has space available for storing new instructions, and to load new instructions into the instruction buffer when the instruction buffer has space available for storing new instructions and before the instruction buffer becomes empty (e.g., no unexecuted instructions), such that the execution stage of the execution engine may continuously execute instructions available in the instruction buffer. This entity may be an entity external to the execution engine, and may monitor the progress of the execution of the instructions stored in the instruction buffer, for example, by reading the head pointer and/or a tail pointer of the instruction buffer to determine if new instructions should be loaded into the instruction buffer.

FIGS. 2A-2D illustrate an example of refiling an instruction buffer 210 using an external entity. A head pointer 220 and a tail pointer 230 may be maintained for instruction buffer 210. Head pointer 220 may indicate the next instruction in instruction buffer 210 to be executed by the execution engine. Tail pointer 230 may indicate the last instruction in instruction buffer 210 to be executed by the execution engine. Head pointer 220 and tail pointer 230 may be used by an instruction decoder or an execution unit to determine the next instruction to be executed and whether all instructions have been executed. As described above, instruction buffer 210 may be much smaller than the size of the instruction code for performing a user function, such as an inference.

As shown in FIG. 2A, to perform the user function, instruction buffer 210 may first be filled with a first portion 240 of the instruction code. Before the execution of first portion 240 of the instruction code, head pointer 220 may point to instruction 0 of instruction buffer 210 and tail pointer 230 may point to the last instruction in instruction buffer 210 as shown in FIG. 2A.

When the execution engine executes instructions in first portion 240, head pointer 220 may be increased by 1 (e.g., by 4 bytes if each instruction includes 4 bytes) each time an instruction is read by the instruction decoder. Tail pointer 230 may still point to the last instruction in instruction buffer 210. After a certain time period, head pointer 220 may point to an instruction within instruction buffer 210 as shown in FIG. 2B. Thus, instruction buffer 210 may include a range 250 from tail pointer 230 to head pointer 220. Range 250 may include instructions that have already been executed and thus can be replaced by new instructions to be executed. The range from head pointer 220 to tail pointer 230 may include unexecuted instructions in first portion 240 of the instruction code.

The external entity, such as a controller or a CPU, may also read tail pointer 230 and head pointer 220 to determine whether new instructions need to be loaded into instruction buffer 210. For example, the external entity may determine the size of range 250 in instruction buffer 210 that may be available for storing new instructions, based on the values of tail pointer 230 and head pointer 220. If the size of range 250 is greater than a threshold value, such as greater than 25% of the size of the instruction buffer, an operation to load new instructions into range 250 of instruction buffer 210 may be triggered by the external entity. The new instructions may be loaded into range 250 using, for example, a DMA controller (or other refill controller) as described above. While the new instructions are being loaded into instruction buffer 210, remaining instructions in first portion 240 of the instruction code may continue to be executed by the execution engine.

As shown in FIG. 2C, after a certain time period, a new portion 260 of the instruction code may be loaded into instruction buffer 210, and tail pointer 230 may point to the end of the new instructions. The head pointer 220 may point to an instruction of first portion 240 as shown in FIG. 2C. The range 250 between the locations pointed to by the new tail pointer 230 and head pointer 220 in instruction buffer 210 may include instructions that have been executed and thus can be replaced by new instructions.

When the size of range 250 reaches the threshold value again, another operation to load new instructions into range 250 may be triggered by the external entity as described above. Thus, more instructions of the instruction code may be loaded into instruction buffer 210, while the execution engine continues to execute instructions in first portion 240 of the instruction code. After a certain time period, tail pointer 230 may point to the end of the new instructions and head pointer 220 may point to the next instruction to be executed in first portion 240 as shown in FIG. 2D. Range 250 between the locations pointed to by the new tail pointer 230 and head pointer 220 in instruction buffer 210 may include instructions that have been executed and thus can be replaced by new instructions.

The above-described process may be performed continuously until there are no more instructions to be loaded into the instruction buffer and the value of the head pointer is equal to the value of the tail pointer. During the process, the external entity may continue to (e.g., periodically) read tail pointer 230 and head pointer 220, determine if new instructions need to be loaded into the instruction buffer, and trigger the loading of the new instructions into the instruction buffer. Using the external entity to read and compare the instruction pointers may use a lot of processing time (e.g., CPU time) and/or hardware resources, or may not be fast enough to determine the time for the next refill.

Referring back to FIG. 1, according to certain embodiments, an instruction loader 160 may split the instruction code used by an execution engine (e.g., computing engine 124, activation engine 128a, or pooling engine 128b) to perform a user function (e.g., an inference) into multiple sections, where the size of each section is less than the size of the instruction buffer, such as less than or equal to a half of the size of the instruction buffer. A refill DMA ring 162 (or other data store) may also be created by instruction loader 160 based on the splitting of the instruction code, where each entry in refill DMA ring 162 may correspond to one section of the instruction code and may be used to load the section of the instruction code into the instruction buffer using the DMA controller 116 (or other refill controller). Software or hardware based methods may use refill DMA ring 162 to automatically refill the instruction buffer.

For example, in some embodiments, an instruction may be added into some sections of the multiple sections of instruction code. The instruction, when executed by the execution engine (e.g., computing engine 124, activation engine 128a, or pooling engine 128b), may cause the DMA controller to copy one or more sections of the instruction code into the instruction buffer based on one or more entries in the refill DMA ring. For example, the instruction may increase the value of a tail pointer of the DMA ring, which may cause the DMA controller to execute one or more entries in the DMA ring, where the entries in the DMA ring may include loading sections of codes into the instruction buffer and/or incrementing a tail pointer of the instruction buffer. In some embodiments, a hardware logic can be added in each execution engine (e.g., computing engine 124, activation engine 128a, or pooling engine 128b) to cause the DMA controller to copy one or more sections of the instruction code into the corresponding instruction buffer based on one or more entries in the refill DMA ring, when the free space in the instruction buffer is greater than a threshold value. In some embodiments, the DMA ring may be restarted to load the same instruction code into the instruction buffer to repeatedly execute the instruction code for different input data (e.g., for inferences based on different input data).

Figure 3:
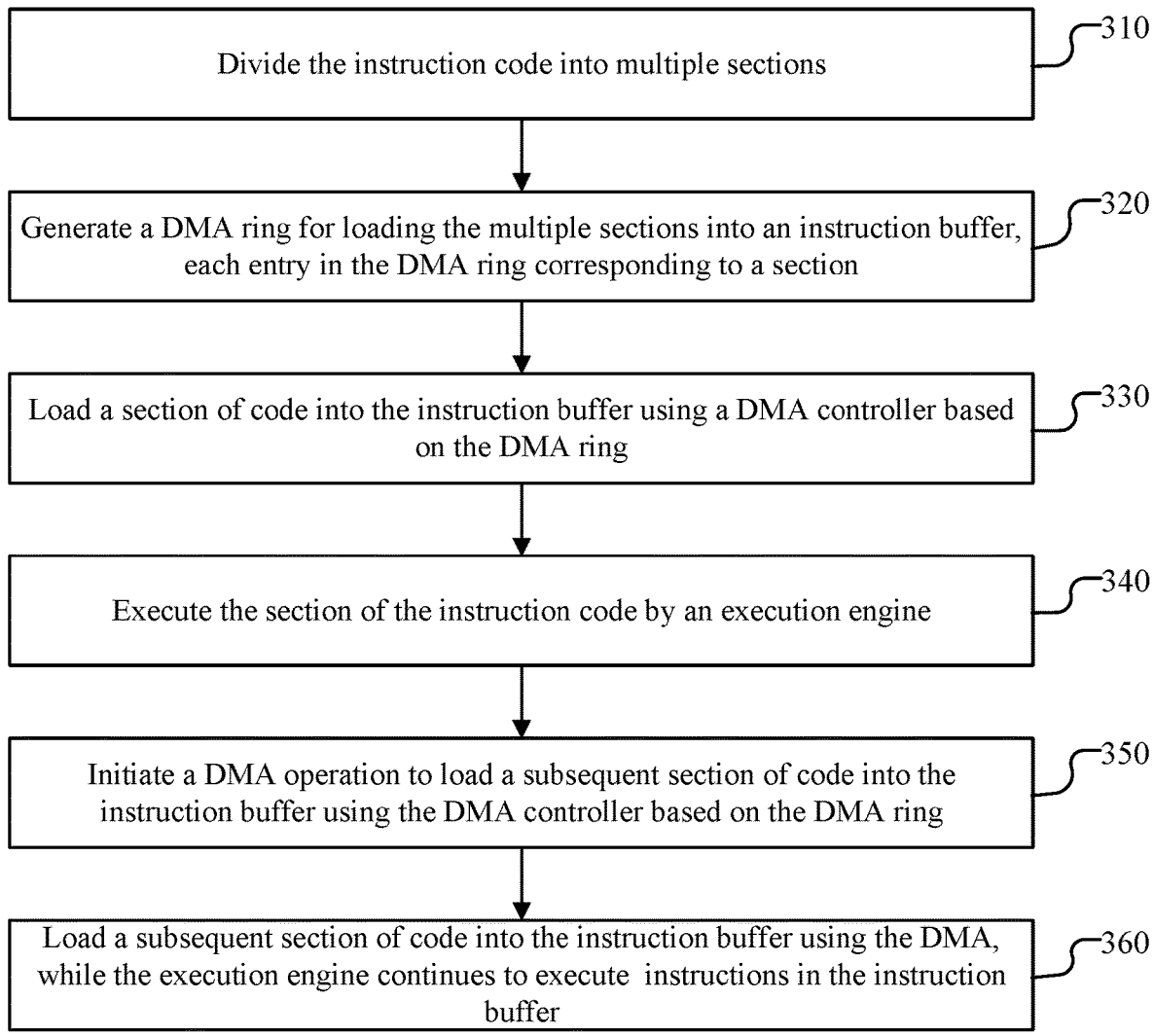
FIG. 3 is a simplified flow chart illustrating an example of a method of self-refilling an instruction buffer according to certain embodiments.

FIG. 3 is a simplified flow chart 300 illustrating an example of a method of self-refilling an instruction buffer according to certain embodiments. The operations in flow chart 300 may be performed by an instruction loader, a DMA controller, and/or an execution engine, such as a general-purpose processing unit, a convolution engine (e.g., computing engine 124), an activation engine (e.g., activation engine 128a), a pooling engine (e.g., pooling engine 128b), a stream processor, etc., using modified software instruction code or a hardware logic. Even though FIG. 3 describes the example of the method as sequential operations, some of the operations may be performed in parallel or concurrently. Some operations may be performed in different orders. An operation may have additional steps not included in the figure. Some operations may be optional, and thus may be omitted in various embodiments. Some operations may be performed together with another operation. Furthermore, embodiments of the method may be implemented in hardware, software, firmware, middleware, microcode, hardware description languages, or any combination thereof.

At block 310, an instruction loader may divide the instruction code for a user function into multiple sections of code. The size of each section is less than the size of the instruction buffer, such as less than or equal to a half of the size of the instruction buffer. In a software-based refilling technique, the instruction loader may add an instruction for triggering a DMA operation in some sections of code. In various embodiments, the instruction for triggering the DMA operation may be inserted at the beginning, in the middle, or at the end of a section of code.

At block 320, the instruction loader may generate a DMA ring (or other data store) for loading the multiple sections into the instruction buffer. Each entry in the DMA ring may correspond to a section of code, and may include a descriptor that can be executed to load the section of code into the instruction buffer using a DMA controller (or other refill controller). The DMA ring may be used by software or hardware based methods to automatically refill the instruction buffer. An example of a DMA ring may include the following pseudo code:

<copy chunk #0 to execution engine (EE) instruction buffer or refill page>
<copy the number of instructions added to EE tail increment register>
<copy chunk #1 to EE instruction buffer or refill page>
<copy the number of instructions added to EE tail increment register>
. . .
<copy chunk # N (last) to EE instruction buffer or refill page>
<copy the number of instructions added to EE tail increment register>

The first line of the above pseudo code may cause the DMA controller to copy a first section of code into the instruction buffer (or a refill page described below). The second line of the above pseudo code may be used to increment the value of the tail pointer of the instruction buffer based on the number of instructions in the first section. Every two consecutive lines may be triggered by software or hardware logic during the execution of the instruction code and may be used to load a section of code into the instruction buffer and increment the value of the tail pointer of the instruction buffer. For example, the software or hardware may increase a tail pointer of the DMA ring to cause one or more lines of the above pseudo code to be executed.

In some embodiments, writing to the instruction buffer (or the refill page) may automatically increment the value of its tail pointer. Thus, the DMA ring may not include the code to explicitly increment the value of the tail pointer of the instruction buffer. An example of a DMA ring used for loading instructions into an instruction buffer that can automatically increment the value of the tail pointer may include the following pseudo code:

<copy chunk #0 to EE instruction buffer or refill page>
<copy chunk #1 to EE instruction buffer or refill page>
. . .
<copy chunk # N (last) to EE instruction buffer or refill page>

In the above pseudo code, each line may be triggered by a software or hardware based method and may cause the DMA controller to copy a section of code into the instruction buffer. Loading each section into the instruction buffer (or the refill page) may cause the value of the tail pointer of the instruction buffer to increment automatically.

At block 330, to execute the instruction code to perform a user function, the instruction loader may assign the DMA ring created at block 320 to a DMA queue. The DMA controller may first load at least one section of the multiple sections of code into the instruction buffer based on the DMA queue specified by the DMA ring. The loading may be triggered when the instruction loader increases the value of a tail pointer of the DMA queue. The loaded at least one section of code may fill a range of the instruction buffer between the head pointer and the tail pointer of the instruction buffer, where the head pointer may point to the next instruction to be executed (e.g., the first instruction before the execution of any instruction) and the tail pointer may point to the last instruction to be executed in the instruction buffer.

At block 340, the execution engine may execute the loaded at least one section of code. As described above with respect to FIG. 2, each instruction in the instruction buffer may be read and decoded by an instruction decoder, and executed by an execution unit of the execution engine. After each instruction is read from the instruction buffer, the value of the head pointer of the instruction buffer may be increased by 1 and point to the next instruction in the instruction buffer to be read, decoded, and executed.

At block 350, during the execution of the section of code or after instructions in the section of instruction code have been executed, the execution engine may trigger a DMA operation to load a subsequent section of code into the instruction buffer using the DMA controller based on the next operation in the DMA queue specified by the DMA ring. The execution engine may trigger the DMA operation based on the available space in the instruction buffer (e.g., the space from the tail pointer to the head pointer in the instruction buffer), by using a hardware logic or by executing an instruction that is inserted into the section of code and would trigger the DMA operation as described in detail below.

At block 360, the DMA controller may load the subsequent section of code into the instruction buffer, while the execution engine continues to execute instructions in the instruction buffer. As described above, the value of the tail pointer of the instruction buffer may be increased accordingly, depending on the number of instructions in the subsequent section. When an instruction in the instruction buffer is read from the instruction buffer, the value of the head pointer of the instruction buffer may be increased by 1. When another instruction for triggering a DMA operation has been executed or when the available space in the instruction buffer is greater than a threshold size, the execution engine may trigger a DMA operation to load another section of code into the instruction buffer using the DMA controller based on the next operation in the DMA queue specified by the DMA ring. The above-described process may be performed until all sections have been loaded into the instruction buffer and have been executed.

According to certain embodiments, the instruction loader may add an instruction at the beginning, in the middle, or at the end of each section of at least some of the multiple sections of code. The added instruction, when executed by the execution engine, may cause the DMA to copy a new section of code into the instruction buffer based on an entry in the DMA ring. Thus, the new section may be loaded into the instruction buffer automatically while instructions in the instruction buffer are being executed. No external entity is needed to monitor the progress of the execution of the instruction code and determine whether a new section of code can be loaded into the instruction buffer.

FIGS. 4A-4D illustrate an example of software-based self-refilling of an instruction buffer 410 according to certain embodiments. As in FIGS. 2A-2D, a head pointer 420 and a tail pointer 430 may be maintained for instruction buffer 410. Head pointer 420 may indicate the next instruction to be executed in instruction buffer 410 and tail pointer 430 may indicate the last instruction to be executed in instruction buffer 410. Head pointer 420 and tail pointer 430 may be used by the instruction decoder or the execution unit to determine the next instruction to be executed and whether all instructions in the instruction buffer have been executed. As described above, instruction buffer 410 may be smaller than the size of the instruction code for performing a user function, such as an inference. An instruction loader may split the instruction code for performing the user function into multiple sections and create a DMA ring for the instruction code based on the splitting as described above. In addition, the instruction loader may add an instruction at the end of some sections of code to cause one or more entries in the DMA ring to be executed (e.g., loading a section of code into the instruction buffer).

Figure 4A:
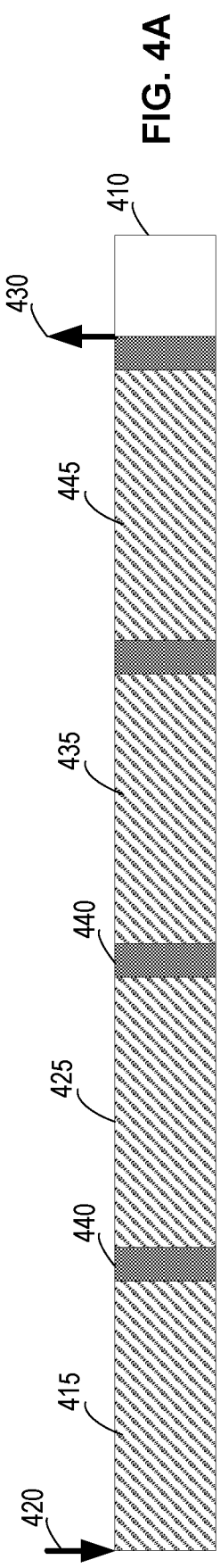
FIGS. 4A-4D illustrate an example of software-based self-refilling of an instruction buffer according to certain embodiments.

To perform the user function, one or more sections (e.g., sections 415, 425, 435, and 445) of the instruction code may be loaded into instruction buffer 410 based on one or more entries in the DMA ring. Each section may include an instruction 440 for triggering a DMA operation in the section (e.g., at the end of the section in the example shown in FIG. 4). Before the execution of first section 415, head pointer 420 may point to instruction 0 of instruction buffer 410 and tail pointer 430 may point to the last instruction in instruction buffer 410 as shown in FIG. 4A.

Figure 4B:
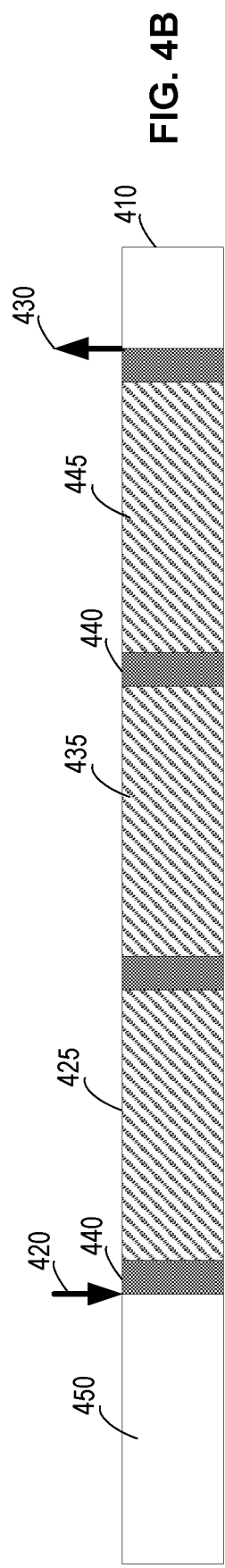

When the execution engine executes instructions in first section 415, the value of head pointer 420 may be increased by 1 (e.g., by 4 bytes if each instruction includes 4 bytes) each time an instruction is read by the instruction decoder. Tail pointer 430 may still point to the last instruction in instruction buffer 410. After a certain time period, head pointer 420 may point to instruction 440 of first section 415 as shown in FIG. 4B. Instruction buffer 410 may now include a range 450 between tail pointer 430 and head pointer 420. Range 450 may include instructions that have already been executed and thus can be replaced by new instructions to be executed. The range between head pointer 420 and tail pointer 430 may include instructions to be executed.

Figure 4C:
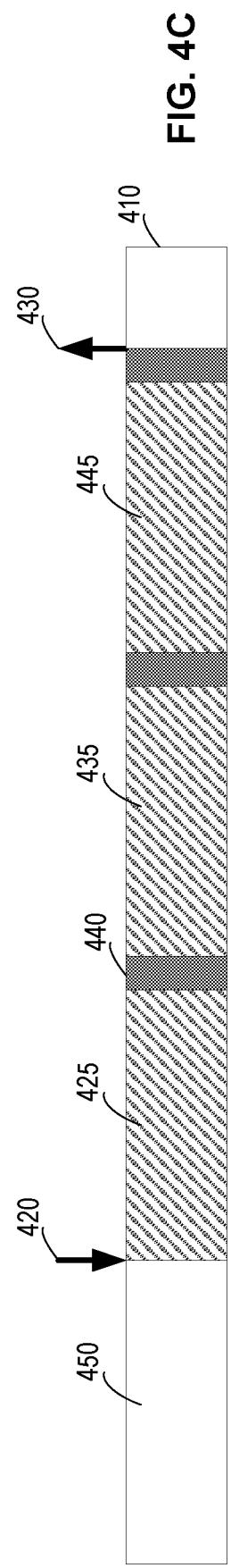

In the next processing cycle of the execution engine, instruction 440 of first section 415 may be read by the instruction decoder and executed by the execution unit. Thus, head pointer 420 may now point to the first instruction in second section 425 as shown in FIG. 4C. The execution of instruction 440 of first section 415 may cause the DMA controller to copy a section of code into the instruction buffer based on the next entry in the refill DMA ring. For example, instruction 440 may increase the tail pointer of the refill DMA ring to trigger the execution of one or more entries in the refill DMA ring. While the new section is being loaded into instruction buffer 410, instructions in second section 425 may continue to be executed by the execution engine.

Figure 4D:
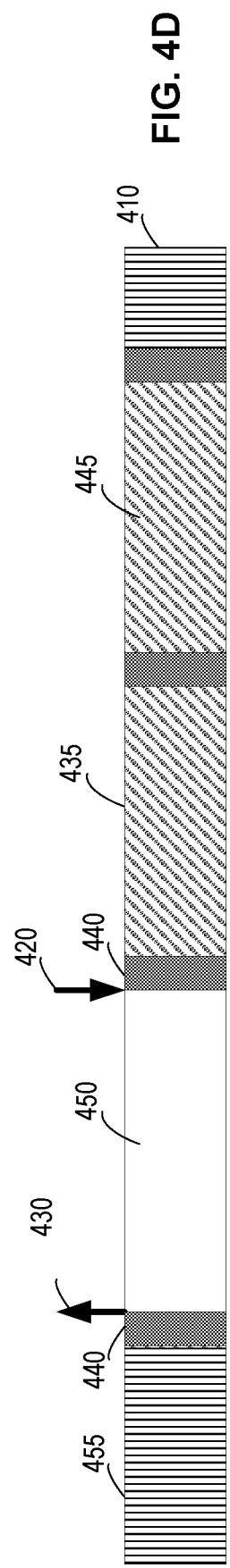

As shown in FIG. 4D, after a certain time period, a section 455 of the instruction code may be loaded into instruction buffer 410, and tail pointer 430 may point to the end of section 455. Section 455 may also include an instruction 440 for triggering a DMA operation at the end of section 455. Head pointer 420 may point to the last instruction 440 of section 425. Range 450 from the new tail pointer 430 to head pointer 420 in instruction buffer 410 may include instructions that have been executed and thus can be replaced by new instructions. The execution of the last instruction 440 of section 425 may trigger the DMA controller to copy another section of code into the instruction buffer based on the next entry in the DMA ring. While the new section is being loaded into instruction buffer 410, instructions in third section 435 may continue to be executed by the execution engine.

The above-described process may be performed continuously until there are no more instructions to be loaded into the instruction buffer (e.g., when there are no more entries to be executed in the DMA ring) and there are no more instructions in the instruction buffer to be executed (e.g., when the value of the head pointer is equal to the value of the tail pointer of the instruction buffer). Thus, the automatic refilling of the instruction buffer can be performed with no change in hardware in the execution engine, and new section of code can be automatically loaded into the instruction buffer after one section in the instruction buffer has been executed, without using an external entity to initiate the refilling. In some embodiments, the instruction for triggering the DMA operation may be added at any location in the section of code (e.g., at the beginning or in the middle of the section of code) to trigger the refilling while the instructions in the section of code are being executed.

In some embodiments, the refill of the instruction buffer can be performed by a hardware logic within the execution engine. The hardware logic may include a configuration register. The configuration register may store a DMA queue index that points to a specific DMA queue associated with the DMA ring for refilling the instruction buffer with instruction code for a specific user function (e.g., an inference). In one example, the hardware logic may be configured to perform the function described by the following pseudo hardware description code:

```
While (DMA queue index is set) {
  If (Instruction buffer free space is >X %) {
    Current_Tail=<current tail pointer>
    DMA queue Tail+2// refill one chunk
    // Do not trigger next DMA until the current one is
       completed
    While(Current_Tail==<current tail pointer>) { }
  }
}.
```

The hardware logic may first determine if the DMA queue index is set in the configuration register. If the DMA queue index is set, the hardware logic may determine the size of the free space (e.g., space available for storing new instructions) in the instruction buffer, for example, based on the tail pointer and the head pointer. If the size of the free space is greater than a threshold value (e.g., a certain percentage), the instruction buffer may be refilled with a new section of instructions. The hardware logic may set a Current_Tail register to a value of the current tail pointer of the instruction buffer as described above, and then trigger the execution of two entries in the DMA queue by increasing the value of a tail pointer of the DMA queue by 2. The two entries in the DMA queue may include an entry for refilling one section of the instruction code into the instruction buffer and another entry for increasing the value of the tail pointer of the instruction buffer after the refilling is done as described above.

The code "While(Current_Tail==<current tail pointer>) { }" may cause the hardware logic to wait for the initiated refilling to be completed before refilling another section, thus preventing the hardware logic from fetching too many sections. Otherwise, it may be possible that the hardware logic may detect free space in the instruction buffer and initiate a refilling again before the DMA controller finishes the previously initiated refilling.

In some embodiments, to prevent the hardware logic from executing entries in the DMA ring assigned to the DMA queue more than one time, the DMA ring or the hardware logic may be configured to disable the refilling after the last section of the instruction code is loaded into the instruction buffer. For example, two additional entries may be added to the end of the DMA ring:

<copy chunk #0 to EE instruction buffer or refill page>
<copy the number of instructions added to EE tail increment register>
<copy chunk #1 to EE instruction buffer or refill page>
<copy the number of instructions added to EE tail increment register>
. . .
<copy chunk # N (last) to EE instruction buffer or refill page>
<copy the number of instructions added to EE tail increment register>
<copy 0xFFFFFFFF to EE DMA queue index register>
<copy 0xFFFFFFFF to EE DMA queue index register>

The two additional entries in the DMA ring cause 0xFFFFFFFF to be written as the DMA queue index to the configuration register, and thus would disable the refilling. Because the hardware logic would trigger the execution of two entries in the DMA queue each time, one for copying the instructions and one for increasing the value of the tail pointer, two identical entries may be added to the DMA ring for disabling the refilling.

In some embodiments, it may be desirable to continuously or repeatedly execute the same instruction code for a user function. For example, a neural network may often continuously perform inferences from different sets of input data. Thus, the instruction code for the user function may need to be repeatedly loaded into the instruction buffer. To accomplish this, the DMA queue to which the DMA ring generated for the instruction code is assigned may be rearmed each time the execution engine has completed the execution of the instruction code. For example, after each inference, the head pointer and tail pointer of the DMA queue may be reset to 0 to reset the DMA queue, and the tail pointer may be increased to start the DMA queue again.

Figure 5:
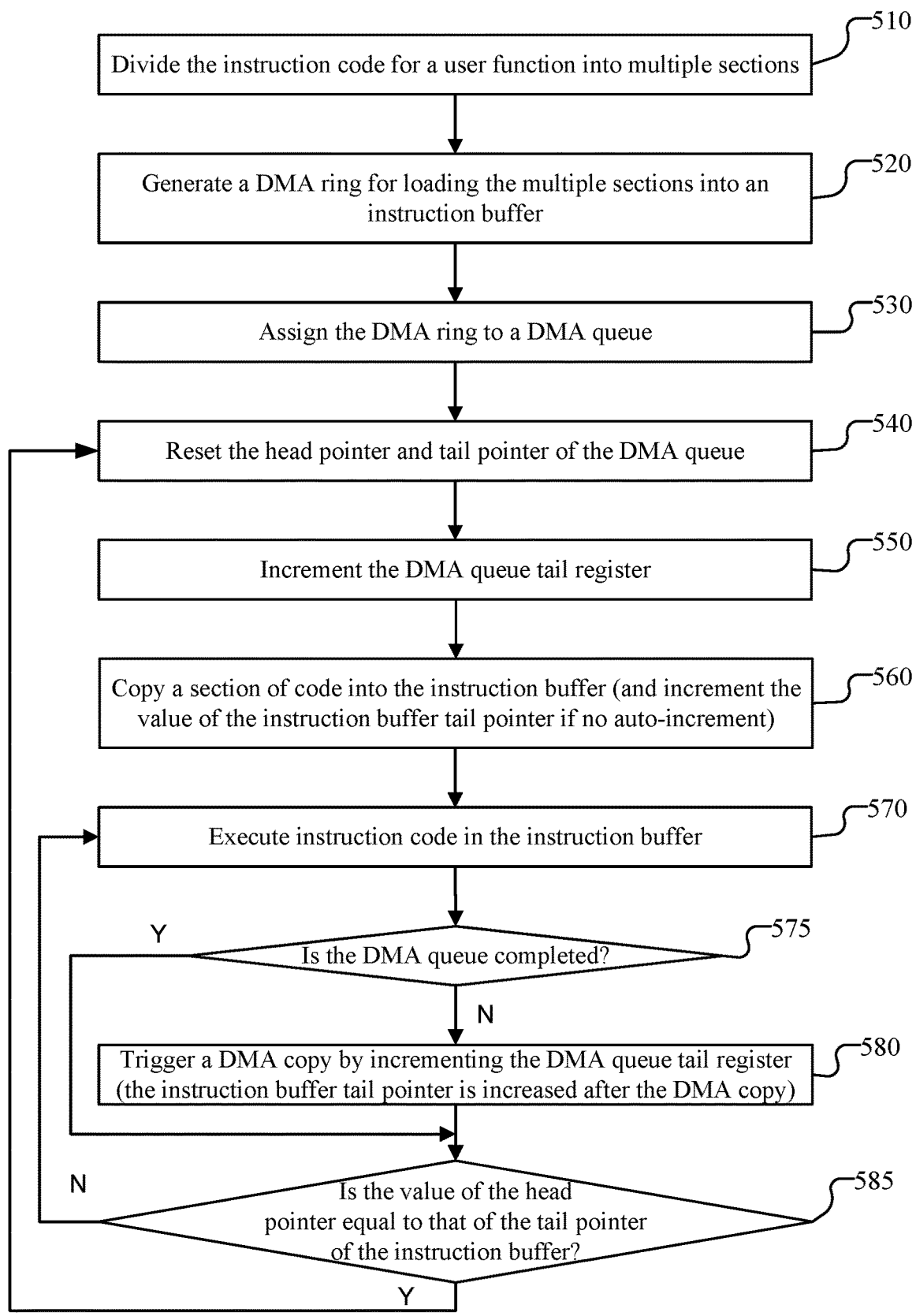
FIG. 5 is a simplified flow chart illustrating an example of a method of continuously executing instructions for performing a user function according to certain embodiments.

FIG. 5 is a simplified flow chart 500 illustrating an example of a method of repeatedly refilling an instruction buffer with instructions for performing a user function according to certain embodiments. The operations in flow chart 500 may be performed by an instruction loader, a DMA controller, and/or an execution engine, such as a general-purpose processing unit, a convolution engine (e.g., computing engine 124), an activation engine (e.g., activation engine 128a), a pooling engine (e.g., pooling engine 128b), a stream processor, etc., using modified software instruction code or a hardware logic.

At block 510, an instruction loader may divide the instruction code for the user function into multiple sections. The size of each section is less than the size of the instruction buffer, such as less than or equal to a half of the size of the instruction buffer. In a software-based refilling technique, the instruction loader may add an instruction for triggering a DMA operation in some sections of code as described above. In various embodiments, the instruction for triggering the DMA operation may be inserted at the beginning, in the middle, or at the end of a section of code. In some embodiments, instructions may be added to, for example, the last section of code to reload the instructions into the instruction buffer, in order to repeatedly executing the instruction code (e.g., for multiple inferences using the same instruction code).

At block 520, a DMA ring for loading the multiple sections into the instruction buffer may be generated as described above with respect to block 320. Each entry (which may include a descriptor) in the DMA ring may correspond to a section of the instruction code, and may be used to load the section of the instruction code to the instruction buffer using a DMA controller. The DMA ring may be used by software or hardware based methods to automatically refill the instruction buffer. If the value of the tail pointer of the instruction buffer is not automatically incremented when new instructions are loaded into the instruction buffer, two entries may be used for loading one section into the instruction buffer, where one entry may be used to load a section of the instruction code into the instruction buffer and another one may be used to increase the value of the tail pointer. If the value of the tail pointer of the instruction buffer is incremented automatically when new instructions are loaded into the instruction buffer, one entry in the DMA ring may be used for loading each section into the instruction buffer.

At block 530, to perform the user function, the DMA ring created at 520 may be assigned to a DMA queue by, for example, the instruction loader. For hardware-based self-refill, a configuration register may store a DMA queue index corresponding to the DMA queue assigned to the DMA ring.

At block 540, the DMA queue may be reset by the instruction loader, or by the execution engine by executing one or more instructions in the instruction buffer, where the head pointer and tail pointer of the DMA queue may be reset to zero. For example, when a DMA queue is first started, the instruction loader may reset the head pointer and tail pointer of the DMA queue. When the DMA queue is to be executed for the second time, the head pointer and tail pointer of the DMA queue may be reset by one or more instructions executed by the execution engine.

At block 550, the instruction loader, an instruction executed by the execution engine, or a hardware logic may start the execution of the instruction code by triggering the loading of at least one section of the instruction code into the instruction buffer. For example, the tail of the DMA queue may be moved forward by at least one entry (if the value of the tail pointer of the instruction buffer is automatically increased) or at least two entries (if the value of the tail pointer of the instruction buffer is not automatically increased) to initiate the copying of at least one section of the instruction code into the instruction buffer by the DMA controller. In some embodiments, operations at block 510 to block 550 may be performed by the instruction loader.

At block 560, the DMA controller may copy at least one section of the instruction code into the instruction buffer. If the value of the tail pointer of the instruction buffer is not automatically increased, the DMA controller may also execute the entry in the DMA queue for increasing the value of the tail pointer of the instruction buffer.

At block 570, the execution engine may execute the section of the instruction code loaded in the instruction buffer. In the software-based self-refill technique, an instruction for triggering a DMA operation in the section of the instruction code may be executed by the execution engine to trigger a DMA operation. In the hardware-based self-refill technique, during the execution of the section of instruction code by the execution engine, the hardware logic may determine the size of the free space in the instruction buffer and determine whether a new section of instruction code can be loaded into the instruction buffer.

At block 575, it may be determined whether the DMA queue is completed. For example, if the head pointer and the tail pointer of the DMA queue are at the end of the DMA queue, all sections of the instruction code may have been loaded into the instruction buffer, and flow chart 500 may proceed to block 585. If the tail of the DMA queue is not at the end of the DMA queue, there may be more sections of the instruction code to be loaded into the instruction buffer, and flow chart 500 may proceed to block 580.

At block 580, a DMA operation to copy a section into the instruction buffer may be triggered by the execution of the instruction for trigger a DMA operation in a section of code in the instruction buffer (in the software-based self-refill technique) or by a hardware logic (in the hardware-based self-refill technique) as described above. As also described above, the DMA operation may be triggered by moving the tail of the DMA queue (e.g., increasing the value in the DMA queue tail register) to cause one or two entries in the DMA queue to be executed, depending on whether the value of the tail pointer of the instruction buffer can be automatically increased. If the value of the tail pointer of the instruction buffer is not automatically increased, an additional entry in the DMA queue may be executed to increase the value of the tail pointer of the instruction buffer after the section is copied to the instruction buffer.

At block 585, it may be determined whether the instruction code for the user function has been fully executed. For example, If the value of the head pointer of the instruction buffer is not equal to the value of the tail pointer of the instruction buffer, the instruction code for the user function may have not been fully executed, and thus flow chart 500 may proceed to block 570 to continue to execute the instruction code. If the value of the head pointer of the instruction buffer is equal to the value of the tail pointer of the instruction buffer, all instructions of the instruction code may have been loaded into the instruction buffer and have been executed, and thus flow chart 500 may proceed to block 540, where the DMA queue may be rearmed (e.g., resetting the head pointer and the tail pointer of the DMA queue to the first entry (e.g., entry 0) in the DMA queue) to execute the instruction code again. As described above, in one embodiment, two instructions may be added to the last section of code to rearm the DMA queue, where one instruction may be used to reset the head pointer and the tail pointer of the DMA queue (e.g., to zero), and another instruction may be used to increment the tail pointer of the DMA queue to start loading at least one section of code into the instruction buffer. In this way, the same DMA queue may be rearmed and executed again after the instruction code for the user application has been fully executed.

Even though FIG. 5 describes the example methods as sequential operations, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Various different techniques may be used to copy sections of the instruction code to the instruction buffer. For example, in some embodiments, a linked-list or a circular buffer may be used. In one embodiment, a certain memory space (e.g., a buffer) may be dedicated for holding instructions. Software code may be executed to prepare N instructions, write them into the buffer, and increment the tail pointer of the buffer by N (e.g., by writing to a tail pointer register) to indicate to the hardware (e.g., the execution engine) that N new instructions have been written. The execution engine may execute the instruction pointed to by the head pointer. Every time an instruction is executed, the hardware may increment the value of the head pointer by 1 (e.g., by writing to or increasing the value of the head pointer register by 1). In this way, the hardware may execute all instructions in the buffer from the head pointer to the tail pointer. The software may be allowed to write to the space behind the head pointer in the buffer (e.g., the space from the tail pointer to the head pointer). Thus, a portion of the buffer that includes the unexecuted instructions may be operated by the hardware, and another portion of the buffer that includes no instructions or only the executed instructions may be operated by the software. Therefore, the software may be allowed to load new instructions in the buffer, while the hardware may execute unexecuted instructions in the buffer in parallel. However, the software may need to determine the addresses in the buffer for storing the new instructions, even though the software may just want to store new instructions in the buffer and the exact address for each new instruction may have no meaning to the software.

According to some embodiments, a refill page (e.g., a 4-8 KB circular buffer or FIFO) may be used by the DMA controller to load instructions into the instruction buffer. A dedicated address space may be used for writing the new instructions into the instruction buffer (e.g., at a location pointed to by the tail pointer of the instruction buffer). Each new instruction may be written into the refill page, and the hardware may copy the new instruction to the instruction buffer at an address pointed to by the tail pointer of the instruction buffer, increase the value of the tail pointer of the instruction buffer by 1, and handle the wrap-around if needed. Thus, the DMA controller may copy sections of instruction code into the refill page without having to track the exact address, so long as the address is within the refill page.

Figure 6:
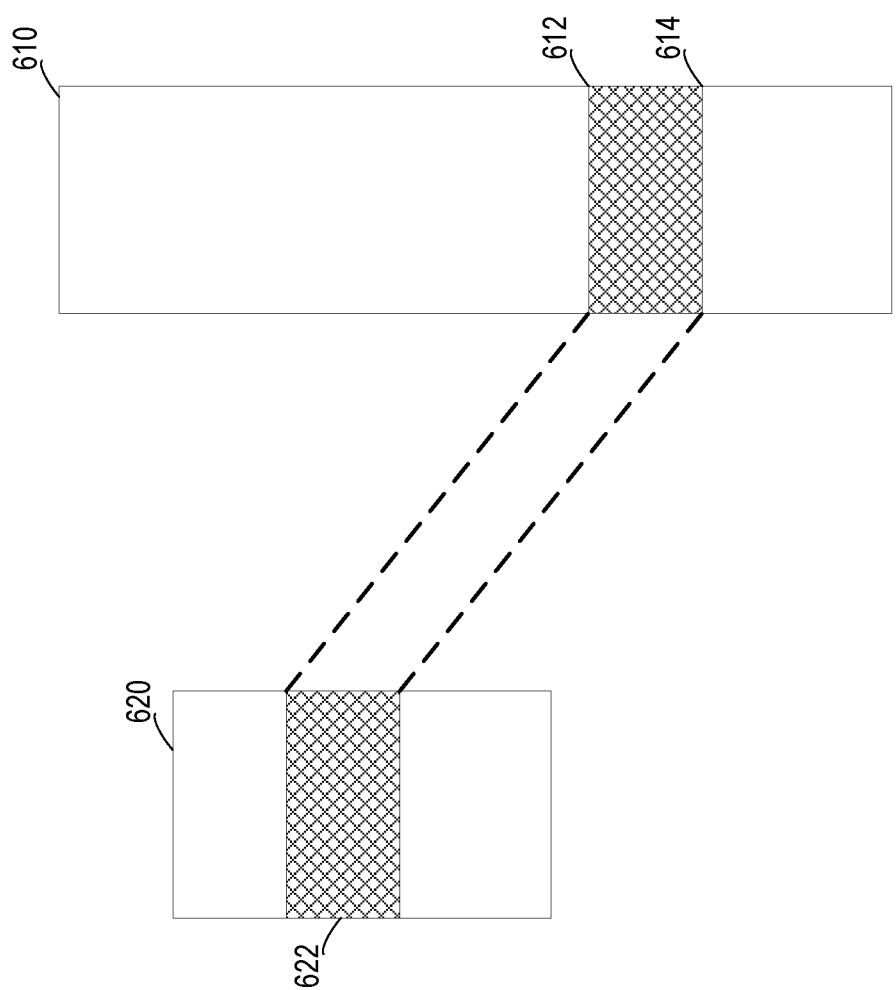
FIG. 6 illustrates a refill page used for refilling an instruction buffer of an execution engine according to certain embodiments.

FIG. 6 illustrates a refill page 620 used for refilling an instruction buffer 610 of an execution engine according to certain embodiments. In some embodiments, refill page 620 may include a circular buffer or a FIFO. Refill page 620 may be large enough to hold, for example, 4 KB of instructions. To load new instructions into instruction buffer 610 at a location after a tail pointer 612, the software may first write the new instructions 622 into refill page 620, where the address space of refill page 620 may be independent from the address space of instruction buffer 610. The software may only need to determine whether the new instruction is to be written into the refill page, but does not need to manage or track the exact address to write to the refill page or the instruction buffer. The instruction written into the refill page may then be written by the hardware to the instruction buffer at an address pointed to by tail pointer 612, and the tail pointer of the instruction buffer may be increased by 1 after the write.

For example, to write each of a set of K instructions into the instruction buffer, N bytes (the size of an instruction, e.g., 4 bytes) may be written into the refill page. The hardware may copy the N bytes to the instruction buffer and increase the value of the tail pointer of the instruction buffer by one. Thus, the software may write K instructions into the refill page at the appropriate location. The hardware may copy the K instructions from the refill page to the instruction buffer, and the value of the tail pointer for the instruction buffer may be increased by K (as indicated by a new tail pointer 614), while the software does not need to manage or track the actual addresses for loading the K instructions into the instruction buffer.

The refill page, rather than a single refill address, may allow the software to submit several instructions in a single memory-write, which in many cases is more efficient than writing the instructions one-by-one. In addition, multiple consecutive writes can be performed on the same refill page. For example, it may be safe to perform two DMA writes into the same address page without a wait between the two writes.

Figure 7:
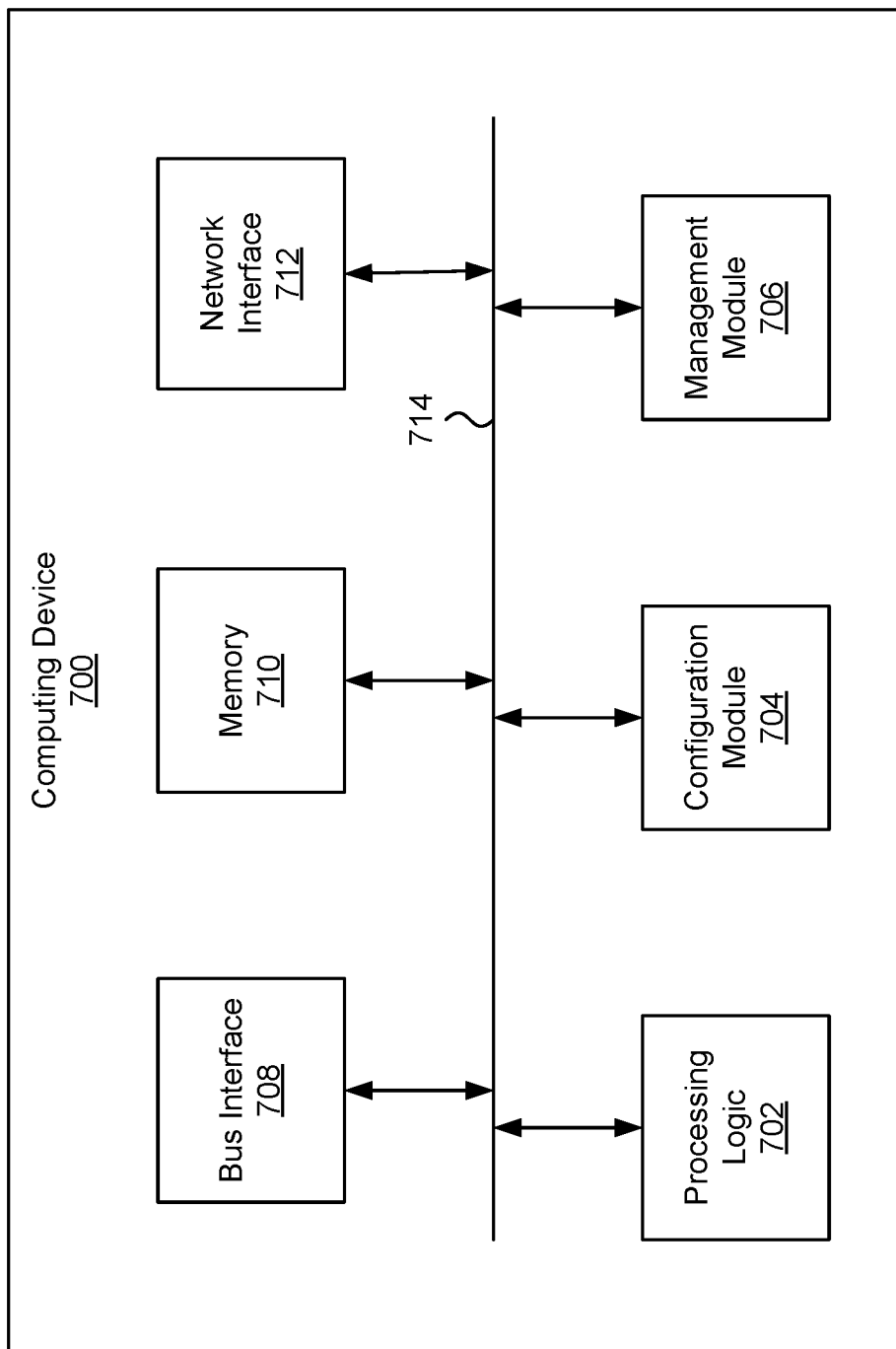
FIG. 7 illustrates an example of a computing device for implementing some of the embodiments disclosed herein.

FIG. 7 illustrates an example of a computing device 700 for implementing some of the embodiments disclosed herein. Functionality and/or several components of the computing device 700 may be used without limitation with other embodiments disclosed elsewhere in this disclosure, without limitations. A computing device 700 may perform computations to facilitate processing of a task. As an illustrative example, computing device 700 can be part of a server in a multi-tenant compute service system. Various hardware and software resources of computing device 700 (e.g., the hardware and software resources associated with provision of an image recognition service) can be allocated to a client upon request.

In one example, the computing device 700 may include processing logic 702, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads.

Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710. Processing logic 702 may also include hardware circuities for performing artificial neural network computation including, for example, Neural network processor 102, etc.

The access to processing logic 702 can be granted to a client to provide the personal assistant service requested by the client. For example, computing device 700 may host a virtual machine, on which an image recognition software application can be executed. The image recognition software application, upon execution, may access processing logic 702 to predict, for example, an object included in an image. As another example, access to processing logic 702 can also be granted as part of bare-metal instance, in which an image recognition software application executing on a client device (e.g., a remote computer, a smart phone, etc.) can directly access processing logic 702 to perform the recognition of an image.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory 710 may also store, for example, software applications for performing artificial neural network computation. For example, memory 710 may store software routines related to the computations of equations above. In a case where processing logic 702 is in the form of FPGA, memory 710 may store netlists data representing various logic circuit components of processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc. In some embodiments, computing device 700 may receive a set of parameters, such as the aforementioned weight vectors for generation of forget gate factor, input factor, output factor, etc. from a server through network interface module 712.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A processor-implemented method comprising:
splitting, by an instruction loader, instruction code into sections of code;
adding into a section of code, by the instruction loader, an instruction for triggering a direct memory access (DMA) operation;
generating, by the instruction loader, a DMA ring for loading the sections of code into an instruction buffer of an execution engine, the DMA ring including multiple entries that, when executed, cause the sections of code to be loaded into the instruction buffer by a DMA controller;
loading, by the DMA controller and based on the entries in the DMA ring, the section of code into the instruction buffer;
executing, by the execution engine, instructions in the section of code, wherein executing the instruction for triggering the DMA operation in the section of code causes the DMA controller to start loading a subsequent section of code into the instruction buffer based on an entry in the DMA ring; and
loading, by the DMA controller, the subsequent section of code into the instruction buffer while the execution engine continues to execute instructions in the instruction buffer.

2. The processor-implemented method of claim 1, wherein the execution engine includes a convolution engine, an activation engine, a pooling engine, or a stream processor in an artificial neural network, or a general-purpose processing engine.

3. The processor-implemented method of claim 1, wherein loading the subsequent section of code into the instruction buffer comprises:
writing the subsequent section of code into a refill memory page that is different from the instruction buffer,
wherein writing the subsequent section of code into the refill memory page causes writing the subsequent section of code into the instruction buffer and incrementing a value of a tail pointer of the instruction buffer based on a number of instructions in the subsequent section of code.

4. The processor-implemented method of claim 1, further comprising:
assigning the DMA ring to a DMA queue;
resetting both a head pointer and a tail pointer of the DMA queue;
incrementing the tail pointer to start the DMA queue; and
restarting the DMA queue after the sections of code have been loaded into the instruction buffer and have been executed by the execution engine, wherein restarting the DMA queue comprises:
resetting both the head pointer and the tail pointer of the DMA queue; and
incrementing the tail pointer.

5. A method comprising:
splitting, by an instruction loader, instruction code into sections of code;
generating, by the instruction loader, a data store for loading the sections of code into an instruction buffer of an execution engine, wherein the data store includes multiple entries that store instructions, the instructions, when executed, causing the sections of code to be loaded into the instruction buffer by a refill controller;
executing, by the execution engine, instructions in a section of code; and
triggering, by the execution engine, a refill operation to load, by the refill controller and based on an entry in the data store, a subsequent section of code into the instruction buffer.

6. The method of claim 5, wherein:
splitting the instruction code into sections of code comprises inserting refill instructions for triggering refill operations into the instruction code; and
triggering the refill operation comprises executing, by the execution engine, a refill instruction for triggering the refill operation.

7. The method of claim 5, wherein triggering the refill operation comprises:
reading, by a hardware logic of the execution engine, a value of a head pointer and a value of a tail pointer of the instruction buffer, wherein the head pointer indicates a next instruction to be executed by the execution engine, and wherein the tail pointer indicates a last instruction in the instruction buffer to be executed by the execution engine;
determining, by the hardware logic, that a memory space from the tail pointer to the head pointer in the instruction buffer is greater than a threshold value; and
triggering, by the hardware logic, the refill controller to perform an instruction stored in an entry in the data store.

8. The method of claim 7, wherein:
the data store includes a direct memory access (DMA) ring, the DMA ring including the entries;
the refill controller includes a DMA controller; and
the method further comprises:
associating a DMA queue with the DMA ring;
writing an identification of the DMA queue in a configuration register to enable the DMA queue; and
writing, after the sections of code have been loaded into the instruction buffer, a predetermined value in the configuration register to disable the DMA queue.

9. The method of claim 5, wherein:
the data store includes a direct memory access (DMA) ring, the DMA ring including the entries; and
the refill controller includes a DMA controller.

10. The method of claim 9, further comprising:
associating, by the instruction loader, the DMA ring with a DMA queue;
setting both a head pointer and a tail pointer of the DMA queue to the first entry in the DMA queue;
starting, by the instruction loader, the DMA queue, wherein starting the DMA queue includes incrementing the tail pointer of the DMA queue; and
restarting the DMA queue after the sections of code have been loaded into the instruction buffer and have been executed by the execution engine, wherein restarting the DMA queue includes:
setting both the head pointer and the tail pointer of the DMA queue to the first entry in the DMA queue; and
incrementing the tail pointer of the DMA queue.

11. The method of claim 9, wherein the DMA ring includes, for each section of code, an entry for causing the DMA controller to perform a DMA operation; and
an entry for incrementing a value of a tail pointer of the instruction buffer, wherein the tail pointer indicates a last instruction in the instruction buffer to be executed by the execution engine.

12. The method of claim 5, wherein loading the subsequent section of code into the instruction buffer comprises:
writing the subsequent section of code into a refill memory page that is different from the instruction buffer,
wherein writing the subsequent section of code into the refill memory page causes writing the subsequent section of code into the instruction buffer and incrementing a value of a tail pointer of the instruction buffer based on a number of instructions in the subsequent section of code.

13. The method of claim 12, wherein the refill memory page includes a circular buffer or a first-in-first-out (FIFO) buffer.

14. The method of claim 5, wherein the execution engine includes a convolution engine, an activation engine, a pooling engine, or a stream processor in an artificial neural network, or a general-purpose processing engine.

15. The method of claim 5, further comprising:
incrementing, after receiving the subsequent section of code, a value of a tail pointer of the instruction buffer based on a number of instructions in the subsequent section of code.

16. An apparatus comprising:
an execution engine; and
a memory device coupled to the execution engine and storing machine-readable instructions, the machine-readable instructions, when executed by the execution engine, causing the execution engine to:
receive, at an instruction buffer of the execution engine, a section of code of a plurality of sections of code split from instruction code for performing a function, wherein:
the instruction code is associated with a data store for loading the sections of code into the instruction buffer of the execution engine; and
the data store includes multiple entries that store instructions, the instructions, when executed, causing the sections of code to be loaded into the instruction buffer by a refill controller;
execute instructions in the section of code; and
trigger a refill operation to load, by the refill controller and based on an entry in the data store, a subsequent section of code into the instruction buffer while the execution engine continues to execute instructions in the instruction buffer.

17. The apparatus of claim 16, wherein:
the section of code includes an instruction for triggering the refill operation; and
triggering the refill operation comprises executing, by the execution engine, the instruction for triggering the refill operation in the section of code.

18. The apparatus of claim 16, wherein the machine-readable instructions, when executed by the execution engine, further cause the execution engine to:
read, by a hardware logic of the execution engine, a value of a head pointer and a value of a tail pointer of the instruction buffer, wherein the head pointer indicates a next instruction to be executed by the execution engine, and wherein the tail pointer indicates a last instruction in the instruction buffer to be executed by the execution engine;
determine, by the hardware logic, that a memory space from the tail pointer to the head pointer in the instruction buffer is greater than a threshold value; and
trigger, by the hardware logic, the refill controller to perform an instruction stored in an entry in the data store.

19. The apparatus of claim 16, wherein loading the subsequent section of code into the instruction buffer comprises:
writing the subsequent section of code into a refill memory page that is different from the instruction buffer,
wherein writing the subsequent section of code into the refill memory page causes writing the subsequent section of code into the instruction buffer and incrementing a value of a tail pointer of the instruction buffer based on a number of instructions in the subsequent section of code.

20. The apparatus of claim 16, further comprising an instruction loader, wherein:
the data store includes a direct memory access (DMA) ring, the DMA ring including the entries;
the refill controller includes a DMA controller; and
the instruction loader is configured to:
insert, into a last section of code of the sections of code,
an instruction for resetting both a head pointer and a tail pointer of a DMA queue to the first entry in the DMA queue; and
an instruction for incrementing the tail pointer of the DMA queue;
associate the DMA ring with the DMA queue;
set both the head pointer and the tail pointer of the DMA queue to the first entry in the DMA queue; and
increment the tail pointer of the DMA queue to start the DMA queue.

* * * * *